United States Patent

Brady

(10) Patent No.: US 9,400,843 B2
(45) Date of Patent: Jul. 26, 2016

(54) ADJUSTING STORED QUERY RELEVANCE DATA BASED ON QUERY TERM SIMILARITY

(75) Inventor: Colin Brady, Sunnyvale, CA (US)

(73) Assignee: Yahoo! Inc., Sunnyvale, CA (US)

(*) Notice: Subject to any disclaimer, the term of this patent is extended or adjusted under 35 U.S.C. 154(b) by 1466 days.

(21) Appl. No.: 11/950,016

(22) Filed: Dec. 4, 2007

(65) Prior Publication Data

US 2009/0144263 A1 Jun. 4, 2009

(51) Int. Cl.
*G06F 17/30* (2006.01)

(52) U.S. Cl.
CPC ................. *G06F 17/30864* (2013.01)

(58) Field of Classification Search
None
See application file for complete search history.

(56) References Cited

U.S. PATENT DOCUMENTS

| | | | |
|---|---|---|---|
| 6,006,225 A * | 12/1999 | Bowman et al. | 707/999.005 |
| 6,078,916 A * | 6/2000 | Culliss | 707/5 |
| 6,594,654 B1 * | 7/2003 | Salam et al. | 707/999.003 |
| 6,601,601 B2 * | 8/2003 | Tamian | 137/38 |
| 7,007,008 B2 * | 2/2006 | Goel et al. | 707/768 |
| 7,139,755 B2 * | 11/2006 | Hammond | 707/767 |
| 7,260,568 B2 * | 8/2007 | Zhang et al. | 707/711 |
| 2003/0014399 A1 * | 1/2003 | Hansen et al. | 707/3 |
| 2004/0186828 A1 * | 9/2004 | Yadav et al. | 707/3 |
| 2005/0060290 A1 * | 3/2005 | Herscovici et al. | 707/3 |
| 2005/0165753 A1 * | 7/2005 | Chen et al. | 707/3 |
| 2006/0026147 A1 * | 2/2006 | Cone et al. | 707/3 |
| 2006/0253586 A1 * | 11/2006 | Woods | 709/226 |
| 2007/0244900 A1 * | 10/2007 | Hopkins et al. | 707/10 |
| 2008/0140643 A1 * | 6/2008 | Ismalon | 707/5 |
| 2008/0215563 A1 * | 9/2008 | Shi et al. | 707/5 |

* cited by examiner

*Primary Examiner* — Charles Adams
(74) *Attorney, Agent, or Firm* — Hickman Palermo; Becker Bingham LLP; Edward A. Becker

(57) ABSTRACT

Techniques are described to improve search results using a panel. A search engine deploys one or more network traffic monitors. Traffic monitors analyze network traffic and find HTTP requests made to search engines. When a search query is spotted, the traffic monitor records the sequence of user requests, including search engine, search terms, and sites visited. A sequence of queries where a user visits one search engine, enters a query, visits zero or more sites from the results listings, and visits a second search engine, enters a query and visits one or more websites and stops searching is used to determine whether to increase or decrease a relevance value between a search term and the sites visited.

18 Claims, 4 Drawing Sheets

ADJUSTING STORED QUERY RELEVANCE DATA BASED ON QUERY TERM SIMILARITY

FIELD OF THE INVENTION

The present invention relates to improving search results of queries to web search engines.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

A search engine is a computer application program that helps a user to locate information based upon the user's alphanumeric input. Using a search engine, a user may enter one or more search query terms to obtain a list of resources or documents that contain or are associated with subject matter that matches those search query terms. While search engines may be applied in a variety of contexts, search engines are especially useful for locating resources or documents that are accessible through the Internet. Resources that may be located through a search engine include, but are not limited to, web documents composed in Hypertext Markup Language (HTML), word processing documents, pictures or other media, or any other type of web document that may be located and retrieved on the Internet. Once the user enters a search query, the search engine generates a list of Universal Resource Locators (URLs) and/or other links to files, documents, or pages, that are likely to be of interest to the user based upon the search query terms.

Most major search engines generate and maintain an index of the Internet by sending an automated web crawler or bot, around the World Wide Web in order to find new web documents and existing, updated web documents. The web crawler makes a copy of each web document found and adds each web document's contents to the index. When a user enters a search query term into a search engine, the search engine analyzes its index and displays a list of results based upon the search query terms.

Search engines order the list of web document results before presenting the list to the user based upon one or more proprietary algorithms. To order the list of web documents, a search engine may assign a rank or value to each document in the list. When the list is sorted by rank, a file with a relatively higher rank or value may be placed closer to the head of the list than a file with a relatively lower rank. The user, when presented with the sorted list, sees the most highly ranked files first. Each search engine ranks web documents based upon their own algorithm. Thus, if a search query is entered in a first search engine and the same query is entered in a second search engine, the results of the queries may be different with web documents having different rankings or not showing up in the results list at all.

The accuracy of ranked files may be measured by relevance. As used herein, "relevance" is a measure of how accurately a particular web document matches the user's search query terms input. For example, the search query "foreign films" would return a list of web documents about films from foreign countries above web documents about films, generally, because web documents about films from foreign countries are likely to be more relevant. Search engines constantly modify their search algorithms in order to provide the most relevant web documents to a user based upon their search query. Otherwise users may resort to competing search engines that provide more relevant results. Thus, identifying and improving relevancy in search results is critical to all search engines companies.

SUMMARY

Requests from a user are found in network traffic. The requests include requests for performances of at least two searches, each based on a separate search term. A similarity value is calculated. The similarity value reflects degrees of similarity between the search terms. A determination is made as to whether the similarity value exceeds a specified threshold. If the similarity value exceeds the specified threshold, then either (a) stored relevance data is updated to reduce a relevance value that indicates relevance between one of the search terms and search result items that the user visited or (b) stored relevance data is updated to increase relevance between the other of the search terms and search result items that the user visited.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
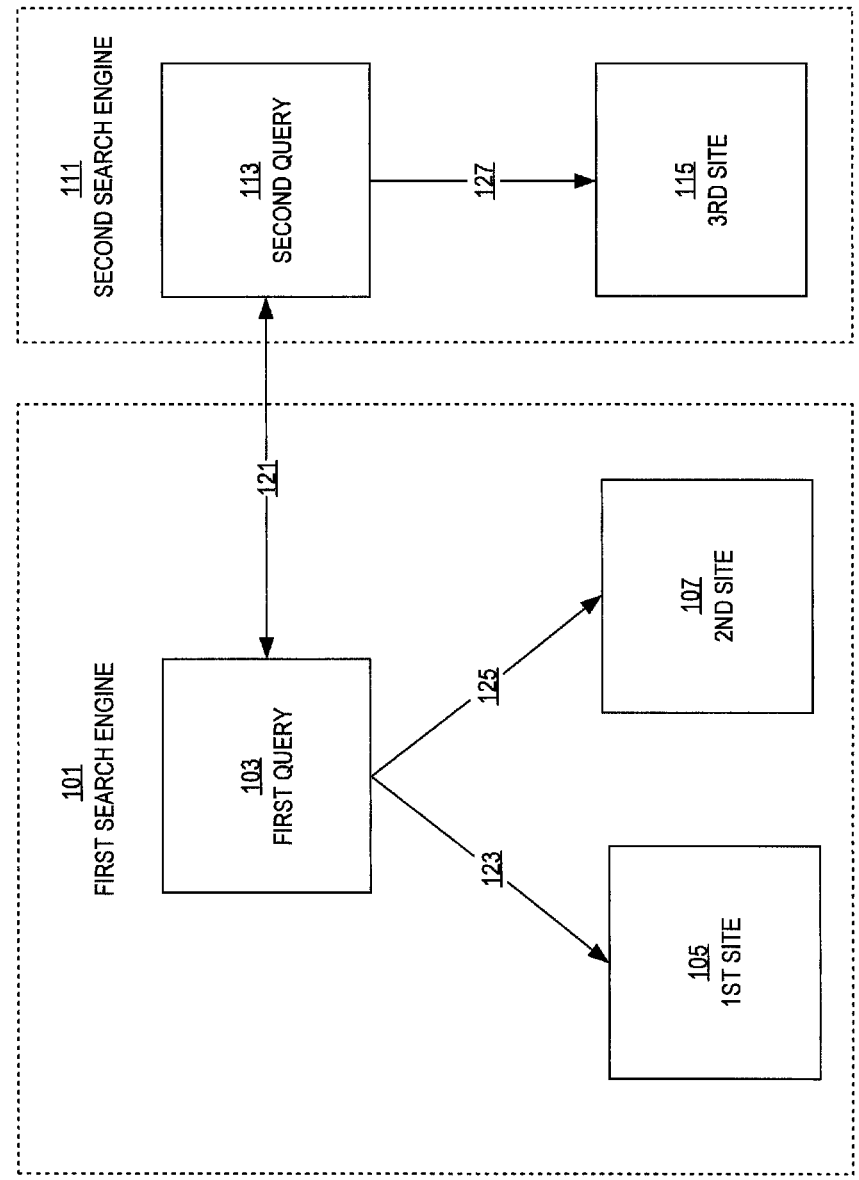
FIG. 1 is a diagram displaying two search engines with queries and websites visited based upon results of those queries, according to an embodiment of the invention.

Techniques are described to improve search results based upon the use of a panel. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Determining relevance is difficult because relevance itself is subjective. Relevancy depends on the task of the user and the context of a search. This may cause identical search queries to have different relevance for different users. For example, users might enter a search query "new cars." A first user wishes to perform an informational task in searching for information about the current year model of cars. In another context, another user enters the same query, "new cars," but with the intent of performing a transaction in searching for places to purchase a new car. Thus, a result of a car information website might appeal to the first user, but a result of a particular car dealership website would appeal more to the second user.

Because of variables such as determining the intent of the user are difficult to quantify, measuring relevance often needs human intervention which leads to a slow and expensive process. One objective method to determine the relevancy of a query term and a website is based upon whether a user selects or "clicks" any of the web documents located in a search result. If a user clicks a web document in a search result, a determination is made that the web document to which the user clicked is relevant to the user relative to the query terms entered by the user. This measure, called the "click-through rate" or "CTR," is an example of objectively quantifying how accurate search results are for a user. If a web document has a high CTR with a particular search term, the search engine will assign a high relevance value to the web document in relation to the term. Using this information allows for automation of the normally work-intensive and expensive process of improving relevancy.

For example, if a user entered the search query term, "sandals," then results might be returned listing websites related to footware, and another website related to the luxury resort operator, Sandals Resorts. If most users click to the website about the luxury resort operator, then footware related websites would have a lower relevance value than the website about the luxury resort operator.

As used herein, "relevance value" refers to the values assigned to a term and a web page. A high relevance value between a term and a web page indicates that the term is absolutely relevant to the intent of a search of the given term. A low relevance value between a term and a web page indicates that the term is not related to the web page. Relevance values may be of any scale. Examples of scales might be 0 to 1 or 0 to 100. A score of 0 indicates no relation between the term and web page. A score of 1 on the first scale or 100 on the second scale indicates absolute relevance. Relevance values are constantly updated to reflect changing tastes and tendencies of web users. In an embodiment, high and low thresholds may also be used to indicate relevance. A high threshold on the scale of 0 to 1 may be 0.70. Thus any term-web page relevance value at 0.70 or greater indicates high relevance. A low threshold might be 0.30, indicating any term-web page relevance value at 0.30 or lower having low relevance between the term and the web page.

A drawback to basing relevance on CTR is that a search engine is only able to analyze statistics of users performing searches on the search engine's own site. Obtaining information of users to multiple search engines and the results of those searches with subsequent user actions may provide more accurate statistics to determine relevancy between search query terms and particular web documents.

As search engines gain more data from various users, the accuracy of the relevance values increases. Relevance values of particular terms and subject matter changes over time so relevance values are dynamic in order to retain accuracy. For example, the term "spam" had a different connotation prior to the pervasiveness of non-solicited junk e-mail. The term "Spam" was originally a processed meat made by Hormel. As the use of the word "spam" to identify unsolicited junk email grew more popular, the relevance of the term changes in relation to various websites. As the use of the term evolves, the relevance of the term relative to the subject matter also changes.

Service Failures

Various techniques are described hereafter for improving search results. In one embodiment, relevance values used to order results produced by a particular search engine are not based only on data from searches performed by that particular search engine. Rather, user behavior is monitored to determine whether the user employs other search engines to perform a similar or identical search. For example, a scenario may occur in which a user enters a search query term in a first search engine and then does not find any web documents in the search results that appeal to him. At that point, the user may enter a second search engine and enter the same search query and then find results that are clicked.

When a user is unable to find a web document that appeals to him based upon the search query, the situation is described as a "service failure." As used herein, a "service failure" occurs where a user enters a search query in a search engine and is unable to find a meaningful result, and as a consequence, the user visits other search engines to find a meaningful result. Decreasing the number of service failures in a search is very important to search engines so that users do not defect to other search engines to obtain more relevant results.

Panels

Panels have been used in a variety of contexts. For example, panels have been used to study user behavior for a particular product. Nielson ratings are used to statistically measure the number of users who watch a particular television program or movie on a television network. Based on statistics gained from users who complete a television diary or have a recording device used to measure the users' viewing habits, Nielson ratings measure a cross-section of all viewers in order to gain ratings that are then statistically applied to obtain a value of how many total viewers are watching a particular program. Heretofore, panels have primarily been used as a marketing tool and not to improve the functionality of a product.

According to one embodiment, user actions and behavior are measured over the entirety of a search in which the user interacts with multiple search engine. As used herein, a "panel" refers to monitoring user actions across multiple search engines to gain further insight as to what a user finds relevant.

Monitoring

In an embodiment, in order to obtain information in an Internet search context, users provide data that details their behavior on a particular search. Obtaining information from search users may be performed in a variety of ways. In an embodiment, a user writes down their actions in a diary that is sent to a processing center so that their data is recorded. For example, a cross section of users is given journals to record searches performed. The information that is included in an entry might comprise search query terms, the name of the search engine, the time of the search, and which particular websites are visited based upon the search. For example, one Internet statistical firm obtains information by monitoring the actions of approximately two million users worldwide.

In another embodiment, a client or widget may be placed on the user's computer in order to record the web locations that a user visits and also the user input that is entered at each location. As used herein, a widget is a small application program placed on a user's computer to perform one or more particular tasks. For example, a widget might be included as part of a search toolbar used in a web browsing application. As a user navigates across various web locations, the widget records locations that the user visits and the content of the sites visited. The widget might also record the data entered by the user in a particular web location. The widget then sends the data back to a central repository where the network traffic data is analyzed.

Data recorded by the widget may be deemed private and so additional measures may be taken to ensure privacy for a user. In an embodiment, users must "opt-in" on the tool bar in order to allow their data to be sent to the central repository. This informs the user that their information may be analyzed and by the user opting-in, the user is confirming that he understands that his actions are recorded and consents to the information sharing. In an embodiment, users must "opt-out" on the tool bar in order to disallow their data to be sent to the central repository. Users read a consent when the toolbar is installed so that the user understands that his information is to be used to track network data. The user then has the option to disallow the information from being used by opting-out.

In another embodiment, no personal information is recorded or sent by the widget. This might be defined by blacklisting particular websites so that no data is recorded when a user visits the particular website. In another embodiment, data is sent from the widget using encryption. Encryption ensures that data, should the data be private, would not be intercepted and used for potential wrongful actions. In another embodiment, data is aggregated with identifying information deleted. For example, data received at a server might aggregate data from many different computers. The server takes the data and only retains data that matches the profile of a "service failure" transaction by a user. All other data is not retained by the server.

In another embodiment, network traffic information is monitored in order to determine whether a user employs multiple search engines in order to search for a particular search query term. The network traffic information may be derived from a variety of sources. In an embodiment, an Internet Service Provider (ISP) provides aggregated traffic logs that track user requests to various sites. These network logs may then be analyzed to find service failures across a plurality of the ISP's users.

In yet another embodiment, traffic monitors may be placed at various points in a network to record network traffic information of users. The traffic monitors record the HTTP requests that pass through the network point and send the information to a server. The server then analyzes the HTTP requests for service failures and records user actions based upon that event.

Query Similarity

To detect service failures, it is important to detect when queries submitted to one search engine are similar to those previously submitted to another search engine. In an embodiment, finding the similarity of queries is based upon correlating the terms of the first query with the terms of the second query. In correlation, the terms of the first query are compared with the terms of the second query to return a correlation value. Correlation values may be of any range, such as 0 to 1 or 1 to 100. In the 0 to 1 scale, a value of 1 indicates that the terms of the first query are identical to the terms of the second query. A correlation value of 0 indicates that the terms of the first query and the second query are completely unrelated. In an embodiment, correlation values are based upon a dictionary, either internally generated or by a third party, that comprises various terms and the correlation of one term to another term.

In an embodiment, high and low thresholds may also be used to indicate correlation values of terms. A high threshold on the scale of 0 to 1 may be 0.70. Thus any term-term correlation value at 0.70 or greater indicates high similarity between the terms. A low threshold on might be 0.30, indicating any term-term correlation value at 0.30 or lower indicates low similarity between the terms.

Adjusting Relevance

In an embodiment, a server monitors network traffic and searches for HTTP requests to search engines. The network traffic may be in the form of a log of user actions to various websites. In another embodiment, network traffic is analyzed in real-time as the network traffic in the form of HTTP requests is being received by the server. When a search query is identified, the traffic monitor records the sequence of user requests, including the search engine that was visited, the search terms input into each search engine, and the sites visited from the search engine.

In an embodiment, the server searches for a sequence where a user visits a first search engine and enters a query. The user visits zero or more sites from the results listings and then visits a second search engine. The user then enters a search query of one or more terms into the second search engine. The user then visits one or more sites based upon the results of the second search engine. The user either stops searching or continues to a third search engine. This scenario is illustrated in FIG. 1.

In FIG. 1, two distinct search engines are represented as a first search engine 101 and a second search engine 111. A user enters a first search query 103 into the first search engine 101 that returns results in response to first search query 103. From the results, the user visits $1^{st}$ site 105, and $2^{nd}$ site 107. Arrow 123 represents the relevance value between terms in first search query 103 and $1^{st}$ site 105. Arrow 125 represents the relevance value between terms in first search query 103 and $2^{nd}$ site 107. A service failure occurs because the user is unable to find the particular information that he is searching and navigates to second search engine 111. The visits to $1^{st}$ site 105 and $2^{nd}$ site 107 are optional to the algorithm and a service failure would also be recorded if the user visited no sites and then navigated to second search engine 111. A service failure would also be detected in the event that more than two sites were visited and the user then navigated to second search engine 111.

At second search engine 111, the user enters second search query 113. Second search query terms 113 may be (1) identical to first search query terms 103, (2) similar to first search query terms 103, or (3) dissimilar to first search query terms 103. Correlation 121 represents a similarity comparison between first search query terms 103 and second search query terms 113. This corresponds to the correlation values comparing terms as described above. Second search engine 111 returns results in response to second search query 113. The user then visits $3^{rd}$ site 115 based upon the listings in the results. Arrow 127 represents the relevance value between terms in second search query 113 and $3^{rd}$ site 115.

Figure 2:
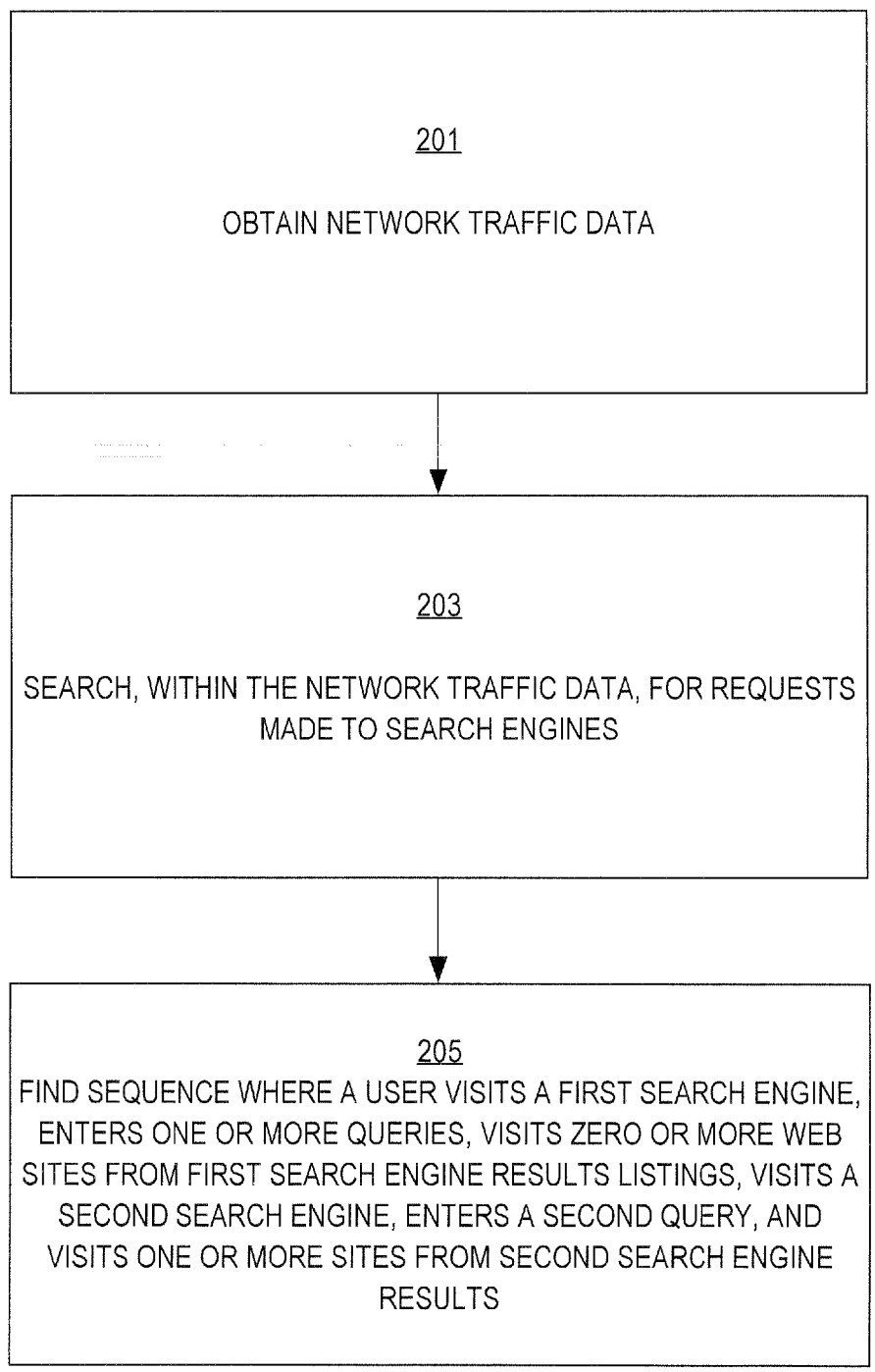
FIG. 2 is a diagram displaying the steps to find the sequence of data to implement improving search results using a panel, according to an embodiment of the invention.

The entire sequence of events, beginning from monitoring network data, are captured in steps illustrated in FIG. 2. In step 201, the server obtains network traffic data. The network traffic data may be of any of a variety of forms, including, but not limited to, real-time data from traffic monitors, logs of data from ISPs, or data transmitted periodically from widgets on toolbars on client computers. In step 203, the network traffic data is searched by the server to find a request made by a user to a search engine. When this request is found, the server, in step 205, extends the search by finding the scenario that describes a service failure. Namely, where a user visits a first search engine, enters one or more queries, and visits zero or more web sites from the first engine search results. The user then visits a second search engine, enters a second query, and then visits one or more websites from the second search engine results. The user may then continue the search to a third search engine or may stop searching at that particular time. In either case, a service failure is detected.

Three possible outcomes may result from finding a service failure as described in step 205 of FIG. 2. In the first case, the terms in the first query entered in the first search engine is highly correlated to the terms of the second query entered in second search engine. In an embodiment, the first case occurs where the correlation value between the first query terms and the second query terms is greater than a specified high threshold. A high threshold in correlation values indicates that the terms being compared are highly similar, or in the most extreme case, identical. The high threshold may be changed at any time and varies from implementation to implementation.

In an embodiment, a determination is made that the first search engine's assessment of the relevance value between the first query terms and second query terms and the sites visited using the first and second query terms are incorrect for this case. In response, the relevance value of the first query terms and sites visited using the first query terms are reduced and the relevance value between the second query terms and the sites visited using the second query terms are increased.

The response attempts to correct the relevance values due to the service failure. The user only visited the second search engine because relevant websites were not be found for the first query term on the first search engine. The user did find a relevant website based upon the second search query on the second search engine. Thus, by increasing relevance values for the second search query term and the website visited based on the second search query term and decreasing relevance values for the first search query term and websites visited based on the first search query term, it becomes more likely that the website visited on the second search engine would appear for the first search engine and websites visited on the first search engine are ranked lower.

In an embodiment, the actual amount of change in the relevance values and how this affects the ranking of a website based upon a particular query term varies from implementation to implementation. For example, a single service failure recorded in response to this method might result in little or no change to the relevance value of the term and the website. A large number of service failures with the same term and website might result in a large change to the relevance value of the term and the website.

Figure 3:
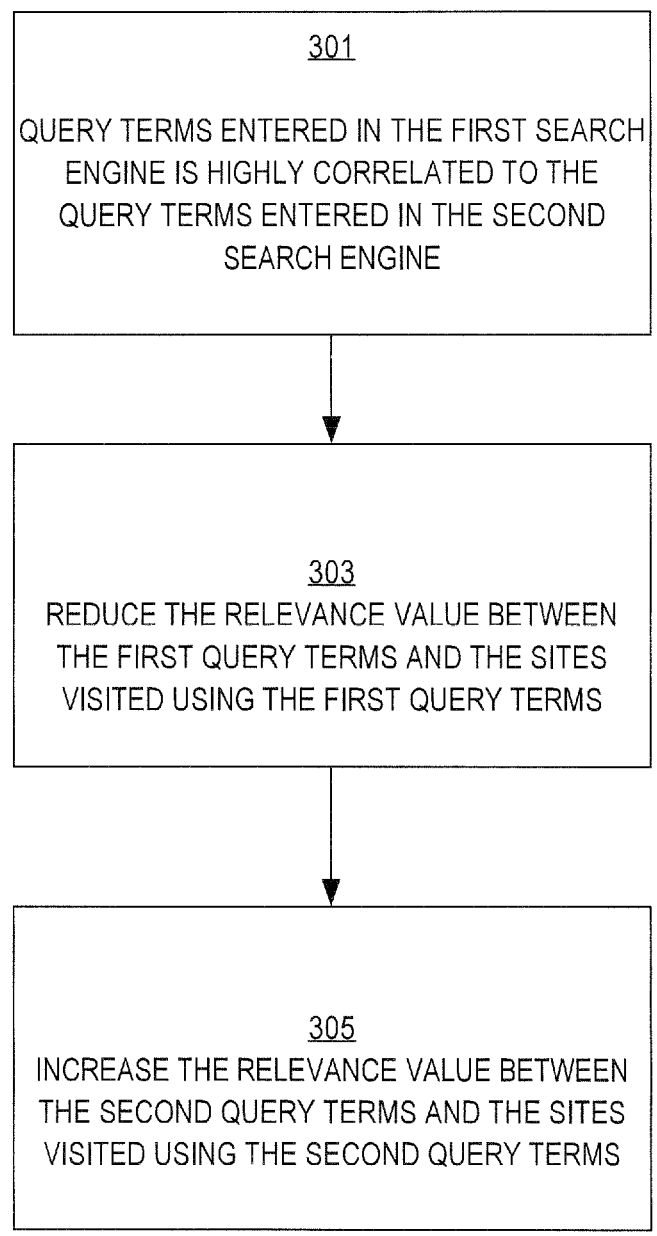
FIG. 3 is a diagram displaying the steps to adjust relevance values for a particular scenario, according to an embodiment of the invention.

The steps in the first case are illustrated in FIG. 3. In step 301 of FIG. 3, the server determines, in the service failure, that the first query terms entered in the first search engine are highly correlated to the second query terms entered in the second search engine. High correlation may occur where correlation values exceed a specified high threshold value. In another example, high correlation may be deemed to occur only where the queries entered in the first search engine and the second search engine are identical.

In response, in step 303, the relevance value between the first query and the sites visited using the first query are decreased. In step 305, the relevance value between the second query and the sites visited using the second query are increased. The actual changes that result may be minimal or nearly zero in cases where few service failures occur. In cases where large quantities of service failures occur, the change in values may be more substantial. The actual changes vary depending upon the implementation.

A second case exists where the first query terms entered into the first search engine is somewhat related to the second query terms entered in the second search engine. In an embodiment, this occurs where the correlation value of the first query terms and second query terms is between a low threshold value and a high threshold value. In this scenario, the first search engine's assessment of the relevance value between the first query terms and the sites visited using the first query terms is incorrect or the correlation values between the first query terms and the second query terms is incorrect.

In an embodiment, this particular case is flagged to be reviewed by a human operator at a later time because of the uncertainty of whether relevance values or correlation values should be corrected. Though the search improvement process may by automated for many tasks, tasks that require subjective judgment calls may need human intervention.

In another embodiment, the second query terms are taken and run on the first search engine. If the results of this search are very similar to the results of the first query terms, then the correlation between the first query terms and the second query terms would appear correct. The relevance values between the first query terms and the sites visited using the first query terms may be decreased and relevance values relevance values between the second query terms and the sites visited using the second query terms may be increased. The automation may occur because of the second check of the second query terms on the first search engine. Receiving very similar results indicates that the correlation between the first search terms and the second search terms are very similar and thus the problem is likely with the relevance value.

In the third possible case, the query entered in the first search engine is not related to the term entered in the second search engine. In an embodiment, this is indicated by the correlation value being less than a specified low threshold value. Under this circumstance, no adjustment is made. An assessment may be made that there is a break in the search sequence and that the searches are for completely different items. In an embodiment, this case may be flagged for optional review by the operator to ensure that the searches are unrelated.

Refinements and Other Uses

In an embodiment, the process is refined by removing data from users that have a high propensity to search for information from multiple search engines. For example, a group of users might always, or almost always, search on more than one search engine to obtain information. Under this circumstance, no "service failure" has occurred as the user always searches for results from more than one search engine and this may lead to incorrect corrections to relevance values. This particular group of users may be blacklisted, or removed, from data analysis for the improved search algorithm.

Though the method is described in the context of search engines, the use of panels to improve products may also be extended to other uses. In an embodiment, the use of panels is used for specific-interest websites. For example, use of panels may be used for auto-related websites where a user is searching for specific information on the first auto-related website. The user might not find the information for which he is searching and navigates to a second auto-related website to find the specific information. The first auto-related website might determine what specific information that the user was searching and add that content or add other features so that users do not navigate to other websites.

In an embodiment, the use of panels may also be applied when only a single search is performed. A search engine is only aware of the search query terms and results of searches for searches performed on its own search engine. Network traffic may be monitored to analyze results from other search engines based upon the same search query terms and user's responses to those results. Based upon reviewing that data, adjustments may be made on relevance values for the first search engine.

Hardware Overview

Figure 4:
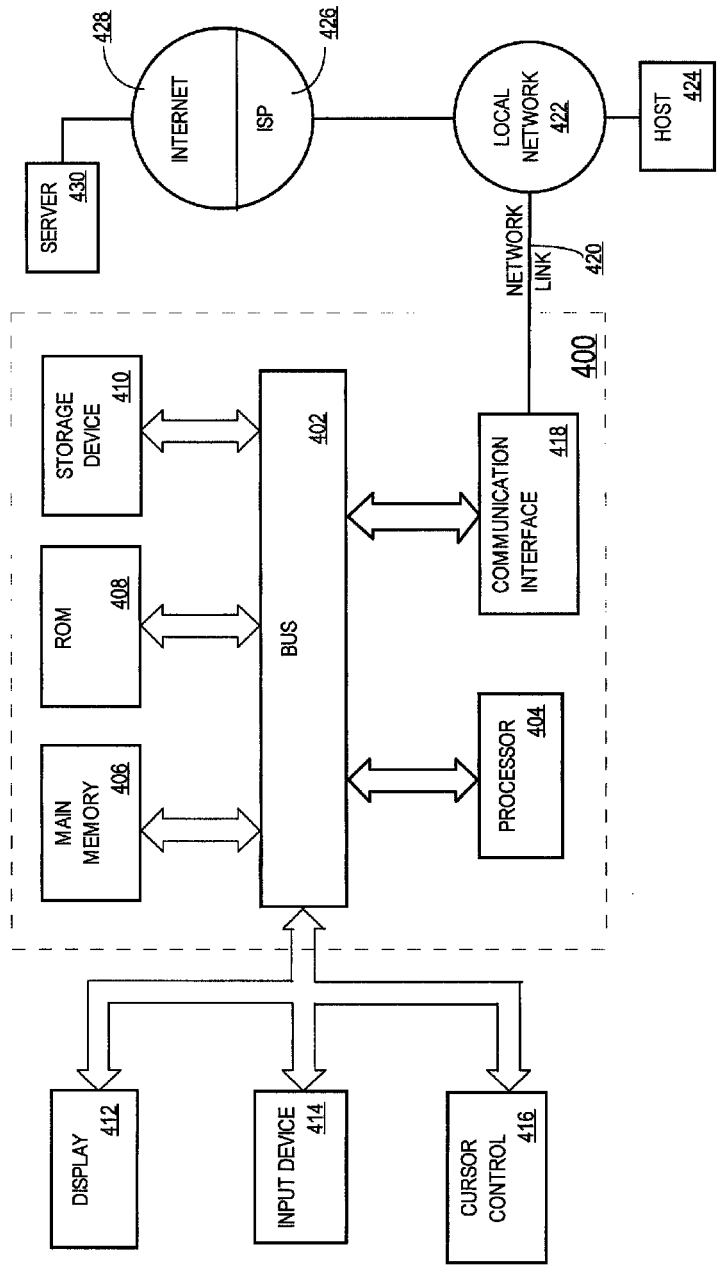
FIG. 4 is a block diagram of a computer system on which embodiments of the invention may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 400, various machine-readable media are involved, for example, in providing instructions to processor 404 for execution. Such a medium may take many forms, including but not limited to storage media and transmission media. Storage media includes both non-volatile media and volatile media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
    retrieving first search results for a first search performed by a user via a first search engine using a first set of one or more search terms, wherein the first search results include a first plurality of items that does not include one or more particular items and the user selects zero or more items from the first plurality of items in the first search results,
    retrieving second search results for a second search performed by the user via a second search engine using a second set of one or more search terms, wherein the second search results include a second plurality of items that includes the one or more particular items and the user selects the one or more particular items from the second search results and wherein the second search engine is different than the first search engine;
    determining a correlation value that indicates similarity between the first set of one or more search terms used for the first search performed by the user via the first search engine and the second set of one or more search terms used for the second search performed by the user via the second search engine;
    determining whether the correlation value that indicates similarity between the first set of one or more search terms used for the first search performed by the user via the first search engine and the second set of one or more search terms used for the second search performed by the user via the second search engine satisfies a specified threshold;
    in response to determining that the correlation value that indicates similarity between the first set of one or more search terms used for the first search performed by the user via the first search engine and the second set of one or more search terms used for the second search performed by the user via the second search engine satisfies the specified threshold and to the user selection of the one or more particular items from the second search results, increasing a likelihood that the one or more particular items selected by the user from the second search results appear in search results for subsequent searches performed via the first search engine using the first set of one or more search terms by decreasing, at the first search engine, a relevance value between one or more other items from the first plurality of items in the first search results and the first set of one or more search terms, wherein the one or more other items from the first plurality of items in the first search results are different than the one or more particular items;
    determining whether the correlation value that indicates similarity between the first set of one or more search terms used for the first search performed by the user via the first search engine and the second set of one or more search terms used for the second search performed by the user via the second search engine is below the specified threshold and above another threshold; and
    upon determining that the correlation value that indicates similarity between the first set of one or more search terms used for the first search performed by the user via the first search engine and the second set of one or more search terms used for the second search performed by the user via the second search engine is below the specified threshold and above the other threshold:
        causing a third search to be performed via the first search engine using the second set of one or more search terms that were used to perform the second search on the second search engine to obtain third search results,
        determining a similarity of the third search results to the first search results by comparing the third search results to the first search results, and
        in response to the determining that the third search results are similar to the first search results, then increasing a relevance value between the second set of one or more search terms and the one or more particular items selected by the user from the second search results;
    wherein the method is performed by one or more computing devices.

2. The method of claim 1, further comprising:
    upon determining that the correlation value that indicates similarity between the first set of one or more search terms used for the first search performed by the user via the first search engine and the second set of one or more search terms used for the second search performed by the user via the second search engine is below the specified threshold and above the other threshold, marking for review by a human operator one or more of the determined correlation value that indicates similarity between the first set of one or more search terms used for the first search performed by the user via the first search engine and the second set of one or more search terms used for the second search performed by the user via the second search engine or the relevance value between the one or more other items from the first plurality of items in the first search results and the first set of one or more search terms.

3. The method of claim 1, wherein the first search results and the second search results are derived from one or more of network logs from a traffic monitor or web traffic recorded by a widget in a toolbar.

4. The method of claim 1, wherein if the user selection of zero or more items from the first plurality of items in the first search results is a selection of the one or more other items from the first plurality of items in the first search results, then decreasing, at the first search engine, a relevance value between one or more other items from the first plurality of items in the first search results and the first set of one or more search terms includes decreasing, at the first search engine, a relevance value between the one or more other items from the first plurality of items in the first search results indicated by the selection of the one or more other items and the first set of one or more search terms.

5. The method of claim 1,
    further comprising in response to determining that the correlation value that indicates similarity between the first set of one or more search terms used for the first search performed by the user via the first search engine and the second set of one or more search terms used for the second search performed by the user via the second search engine is above the specified threshold, increasing the relevance value between the one or more particular items selected by the user and the second set of one or more search terms.

6. The method of claim 1, wherein the specified threshold is a value such that the correlation value that indicates similarity between the first set of one or more search terms used for the first search performed by the user via the first search engine and the second set of one or more search terms used for the second search performed by the user via the second search engine indicates that the first and second search terms are identical.

7. The method of claim 1, wherein the relevance value between one or more other items from the first plurality of items in the first search results and the first set of one or more search terms is maintained by the first search engine.

8. The method of claim 1, wherein the determining a correlation value that indicates similarity between the first set of one or more search terms used for the first search performed by the user via the first search engine and the second set of one or more search terms used for the second search performed by the user via the second search engine includes:
    basing the correlation value on values within a database of correlation values between search terms; and
    comparing the first set of one or more search terms to the second set of one or more search terms.

9. The method of claim 1, wherein decreasing, at the first search engine, the relevance value between the one or more other items from the first plurality of items in the first search results and the first set of one or more search terms includes decreasing, at the first search engine, the relevance value between the one or more other items from the first plurality of items in the first search results and the first set of one or more search terms by an extent that is based at least in part on a quantity of service failures that occurred relative to searches that the first search engine performed based on the first set of one or more search terms.

10. One or more non-transitory computer-readable storage media storing instructions which, when processed by one or more processors, causes:
    retrieving first search results for a first search performed by a user via a first search engine using a first set of one or more search terms, wherein the first search results include a first plurality of items that does not include one or more particular items and the user selects zero or more items from the first plurality of items in the first search results,
    retrieving second search results for a second search performed by the user via a second search engine using a second set of one or more search terms, wherein the second search results include a second plurality of items that includes the one or more particular items and the user selects the one or more particular items from the second search results and wherein the second search engine is different than the first search engine;
    determining a correlation value that indicates similarity between the first set of one or more search terms used for the first search performed by the user via the first search engine and the second set of one or more search terms used for the second search performed by the user via the second search engine;
    determining whether the correlation value that indicates similarity between the first set of one or more search terms used for the first search performed by the user via the first search engine and the second set of one or more search terms used for the second search performed by the user via the second search engine satisfies a specified threshold; and
    in response to determining that the correlation value that indicates similarity between the first set of one or more search terms used for the first search performed by the user via the first search engine and the second set of one or more search terms used for the second search performed by the user via the second search engine satisfies the specified threshold and to the user selection of the one or more particular items from the second search results, increasing a likelihood that the one or more particular items selected by the user from the second search results appear in search results for subsequent searches performed via the first search engine using the first set of one or more search terms by decreasing, at the first search engine, a relevance value between one or more other items from the first plurality of items in the first search results and the first set of one or more search terms, wherein the one or more other items from the first plurality of items in the first search results are different than the one or more particular items;
    determining whether the correlation value that indicates similarity between the first set of one or more search terms used for the first search performed by the user via the first search engine and the second set of one or more search terms used for the second search performed by the user via the second search engine is below the specified threshold and above another threshold; and
    upon determining that the correlation value that indicates similarity between the first set of one or more search terms used for the first search performed by the user via the first search engine and the second set of one or more search terms used for the second search performed by the user via the second search engine is below the specified threshold and above the other threshold:
        causing a third search to be performed via the first search engine using the second set of one or more search terms that were used to perform the second search on the second search engine to obtain third search results,
        determining a similarity of the third search results to the first search results by comparing the third search results to the first search results, and
        in response to the determining that the third search results are similar to the first search results, then increasing a relevance value between the second set of one or more search terms and the one or more particular items selected by the user from the second search results.

11. The one or more non-transitory computer-readable media of claim 10, further comprising additional instructions which, when processed by the one or more processors, cause:
    upon determining that the correlation value that indicates similarity between the first set of one or more search terms used for the first search performed by the user via the first search engine and the second set of one or more search terms used for the second search performed by the user via the second search engine is below the specified threshold and above the other threshold, marking for review by a human operator one or more of the determined correlation value that indicates similarity between the first set of one or more search terms used for the first search performed by the user via the first search engine and the second set of one or more search terms used for the second search performed by the user via the second search engine or the relevance value between the one or more other items from the first plurality of items in the first search results and the first set of one or more search terms.

12. The one or more non-transitory computer-readable media of claim 10, wherein the first search results and the second search results are derived from one or more of network logs from a traffic monitor or web traffic recorded by a widget in a toolbar.

13. The one or more non-transitory computer-readable media of claim 10, wherein if the user selection of zero or more items from the first plurality of items in the first search results is a selection of the one or more other items from the first plurality of items in the first search results, then decreasing, at the first search engine, a relevance value between one or more other items from the first plurality of items in the first search results and the first set of one or more search terms includes decreasing, at the first search engine, a relevance value between the one or more other items from the first plurality of items in the first search results indicated by the selection of the one or more other items and the first set of one or more search terms.

14. The one or more non-transitory computer-readable media of claim 10, the one or more non-transitory computer-readable media further comprise additional instructions which, when processed by the one or more processors, cause in response to determining that the correlation value that indicates similarity between the first set of one or more search terms used for the first search performed by the user via the first search engine and the second set of one or more search terms used for the second search performed by the user via the second search engine is above the specified threshold, increasing the relevance value between the one or more particular items selected by the user and the second set of one or more search terms.

15. The one or more non-transitory computer-readable media of claim 10, wherein the specified threshold is a value such that the correlation value that indicates similarity between the first set of one or more search terms used for the first search performed by the user via the first search engine and the second set of one or more search terms used for the second search performed by the user via the second search engine indicates that the first and second search terms are identical.

16. The one or more non-transitory computer-readable media of claim 10, wherein the relevance value between one or more other items from the first plurality of items in the first search results and the first set of one or more search terms is maintained by the first search engine.

17. The one or more non-transitory computer-readable media of claim 10, wherein the determining a correlation value that indicates similarity between the first set of one or more search terms used for the first search performed by the user via the first search engine and the second set of one or more search terms used for the second search performed by the user via the second search engine includes:

basing the correlation value on values within a database of correlation values between search terms; and comparing the first set of one or more search terms to the second set of one or more search terms.

18. The one or more non-transitory computer-readable storage media of claim 10, decreasing, at the first search engine, the relevance value between the one or more other items from the first plurality of items in the first search results and the first set of one or more search terms includes decreasing, at the first search engine, the relevance value between the one or more other items from the first plurality of items the first search results and the first set of one or more search terms by an extent that is based at least in part on a quantity of service failures that occurred relative to searches that the first search engine performed based on the first set of one or more search terms.

* * * * *